United States Patent
Curtin

(10) Patent No.: US 7,634,236 B2
(45) Date of Patent: Dec. 15, 2009

(54) CONTROLLED SIGNAL-TO-NOISE RATIO GENERATOR CIRCUIT

(75) Inventor: Michael Thomas Curtin, Melbourne, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 482 days.

(21) Appl. No.: 11/599,759

(22) Filed: Nov. 15, 2006

(65) Prior Publication Data

US 2008/0113638 A1 May 15, 2008

(51) Int. Cl.
*H04B 17/00* (2006.01)
(52) U.S. Cl. .............. 455/67.11; 455/67.14; 455/226.1; 455/226.3
(58) Field of Classification Search .............. 455/67.11, 455/67.14, 115.1, 115.2, 226.1, 226.3
See application file for complete search history.

(56) References Cited

U.S. PATENT DOCUMENTS

| 4,742,561 | A | * | 5/1988 | Tipton ...................... 455/67.12 |
| 4,776,032 | A | * | 10/1988 | Odate et al. .................... 455/24 |
| 5,109,535 | A | * | 4/1992 | Kume et al. ............... 455/67.15 |
| 5,719,905 | A | * | 2/1998 | Cohen et al. ................. 375/346 |
| 6,011,962 | A | * | 1/2000 | Lindenmeier et al. .... 455/226.1 |
| 6,081,700 | A | * | 6/2000 | Salvi et al. ................ 455/193.3 |
| 6,313,619 | B1 | * | 11/2001 | Roth ........................ 324/76.19 |
| 6,564,350 | B1 | * | 5/2003 | Hoeweler et al. ........... 714/742 |
| 6,600,906 | B1 | * | 7/2003 | Roppongi .................... 455/118 |
| 6,782,246 | B1 | * | 8/2004 | Kretschmer et al. ....... 455/226.3 |
| 6,813,477 | B1 | * | 11/2004 | Harris et al. ............. 455/67.14 |
| 6,940,263 | B2 | * | 9/2005 | Henriksson .............. 324/76.19 |
| 7,509,106 | B2 | * | 3/2009 | Okanobu ................. 455/226.1 |

OTHER PUBLICATIONS

Using Noise for RF Receiver Built-In Test Applications, Microwave Journal, Feb. 2004, by Patric Robbins, Micronetis, Inc. Hudson, NH.

* cited by examiner

*Primary Examiner*—Duc M Nguyen
(74) *Attorney, Agent, or Firm*—Louis L. Dachs

(57) ABSTRACT

The invention is an electronic circuit for testing a receiver. In detail, the circuit includes a RF signal generator providing an RF signal to a first mixer. A first oscillator providing a first signal to the first mixer. The first mixer receives the RF signal and the first signal and provides a first output signal comprising the RF signal plus the first signal and the RF signal minus the first signal. A first filter is coupled to the first mixer for receiving the first output signal and providing a second output signal wherein the RF signal plus the first output signal is removed. A second mixer is coupled to the first filter and is adapted to receive the second output signal and a second input signal from a second oscillator; and provides a third output signal to a second filter. A fourth output signal from the second filter provides a fifth output signal for testing the receiver that is amplitude and temperature insensitive.

1 Claim, 2 Drawing Sheets

CONTROLLED SIGNAL-TO-NOISE RATIO GENERATOR CIRCUIT

BACKGROUND OF THE INVENTION

1. Field of the Invention

The invention relates to the field of electronic test equipment and electronic systems and, in particular, to a circuit design that provides an amplitude and temperature-insensitive signal-to-noise ratio for determining the performance of equipment such as radio receivers and the like.

2. Description of Related Art

Microwave thermal noise has long been employed for built-in test (BIT) of receivers and radiometers. Such systems are discussed in Microwave Journal article "Using Noise For RF Receivers Built In Test Applications" by Patrick Robbins, dated February, 2004. A common application using noise is to test the RF spectral gain/loss response of the front-end transmission line and microwave control components from the antenna through the RF receiver. The receiver then detects the noise signal, which, in theory, is flat over the frequency band. If the detector is swept over frequency, the system will have the spectral data of its front end.

If the noise source is used in conjunction with a received RF signal (either an over-the-air signal or an injected signal, wherein injected implies the signal is directly applied, for example, via a coaxial cable (or similar connection) or otherwise provided by the receiver itself) to create a known signal-to-noise ratio then it becomes important to closely control not only the level of the noise but also the level of the received signal. This becomes difficult as received signal levels fluctuate and the operating temperature of the system changes. A known signal-to-noise ratio produces a known performance level in the receiver.

Thus, it is a primary object of the invention to provide a circuit for generating a test signal to determine if an electronic communication system is working properly.

It is another primary object of the invention to provide a circuit for generating a test signal to determine if an electronic device is working properly by generating a controlled signal-to-noise ratio test signal.

It is a further object of the invention to provide a circuit for generating a test signal to determine if an electronic device is working properly by generating a controlled signal-to-noise ratio test signal that is independent of both the received signal amplitude and operating temperature.

It is a further object of the invention to provide a circuit for generating a test signal to determine if an electronic device is working properly by generating a controlled signal-to-noise ratio test signal that is independent of both the received signal amplitude and operating temperature wherein both the signal and noise are derived from the signal.

SUMMARY OF THE INVENTION

The invention is an electronic circuit for testing a receiver. In detail, the circuit includes a RF input signal to a first mixer. A first local oscillator is coupled to the first mixer and provides a second input signal to the first mixer. The first mixer provides a first output signal that includes two key components; the first being a signal at the (RF signal frequency plus the first local oscillator signal frequency) and the second being a signal at the (RF signal frequency minus the first local oscillator signal frequency). A first filter coupled to the first mixer for receiving the first output signal from the first mixer provides a second output signal wherein the (RF signal frequency plus the first local oscillator signal frequency) is removed and the (RF signal frequency minus the first local oscillator signal frequency) remains. A second mixer coupled to the first filter receives the second output signal. A second local oscillator is coupled to the second mixer and provides a second input signal to the second mixer.

The second mixer provides a third output signal that includes two key components; the first being a signal at the (second output frequency minus the second local oscillator signal frequency) termed the intermediate frequency signal and the second being a signal at the (second output frequency plus the second local oscillator signal frequency) termed the image frequency signal. The intermediate frequency signal functions as the desired "signal" while the image frequency signal functions as the "noise". A second filter coupled to the second mixer for receiving the third output signal from the second mixer provides a fourth output signal; the second filter represents the intermediate frequency passband of the receiver.

The ratio of the intermediate frequency signal to the image frequency signal in the passband of the receiver creates a controlled signal-to-noise ratio. Because both the intermediate frequency signal and the image frequency signal are created from the same second output frequency which, in turn, was created from the same RF input signal, the signal-to-noise ratio does not vary with fluctuations in the RF input signal. Additionally, because the intermediate frequency signal and the image frequency signal are relatively close in frequency such that the conversion loss of the second mixer is flat for both signals the signal-to-noise ratio does not vary with changes in operating temperature.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
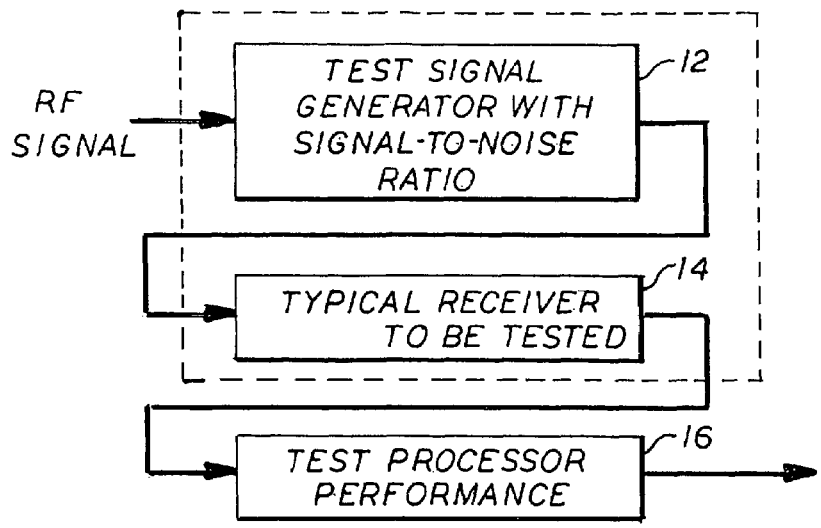
FIG. 1 is a block diagram of how a test circuit consistent with this invention is used to test a receiver.

The typical system for testing a receiver is shown in FIG. 1. In the following description, the short hand abbreviations are used.

RF: Radio Frequency Signal
LO: Local Oscillator Signal
IF: Intermediate Frequency Signal SNR: Signal-to-Noise Ratio
IM: Image Frequency
dF: Difference Between Two Frequencies=IM−IF The system includes a source of received RF signal 15 that is fed to a signal-to-noise generator device 12, which is fed to the device 14 to be tested, for example a receiver. The output from the device 14 is fed to a test processor 16 that determines whether some measurable performance of the device that is tested is within acceptable limits. Such devices 12 are old in the art, however, in order to provide a controlled signal-to-noise ratio signal they require tight control of both the received RF signal and the source of noise. This becomes increasingly difficult where fluctuations occur in the received RF signal amplitude and changes in operating temperature.

Figure 2:
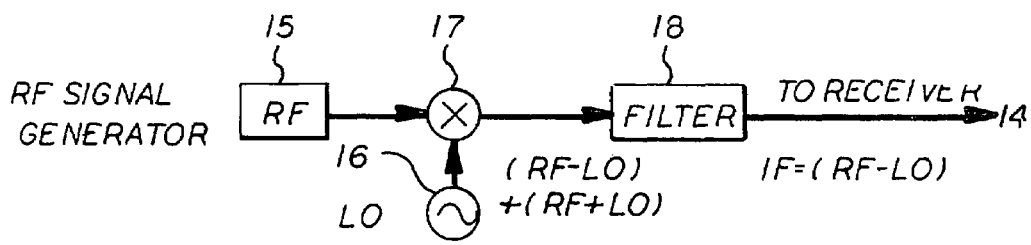
FIG. 2 is a typical prior art circuit of a single conversion heterodyne receiver.

Referring to FIG. 2, in a typical receiver an RF signal may be down-converted to a lower intermediate frequency (IF) using a signal from a local oscillator 16; wherein both signals are provided to a mixer 17 such that the desired output signal is:

$$IF=(RF-LO).$$

The image is:

$$IM=(RF+LO)$$

The IM signal is a generally undesired feature and is therefore filtered and removed by filter 18 which represents the IF filter of the receiver. The LO frequency is typically chosen so that the IM can be easily filtered and removed.

Figure 3:
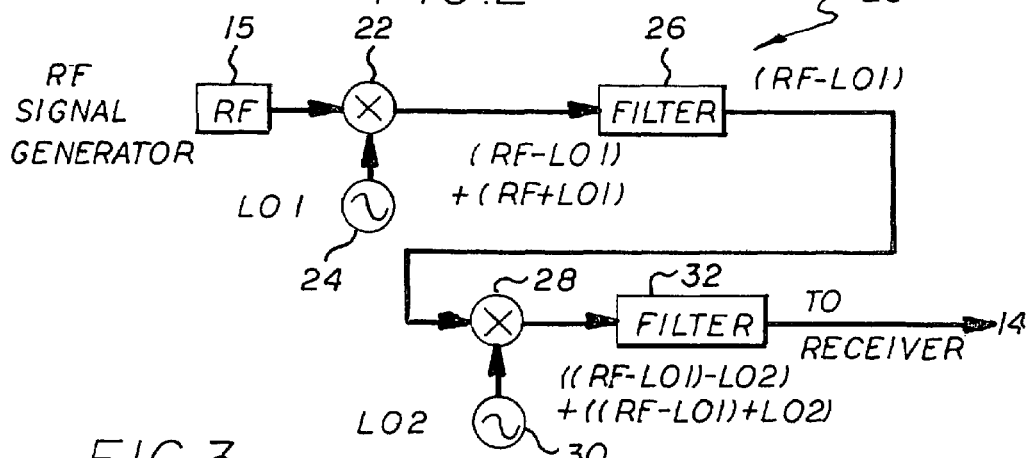
FIG. 3 is the subject circuit for providing the controlled signal-to-noise ratio test signal.
Figure 4:
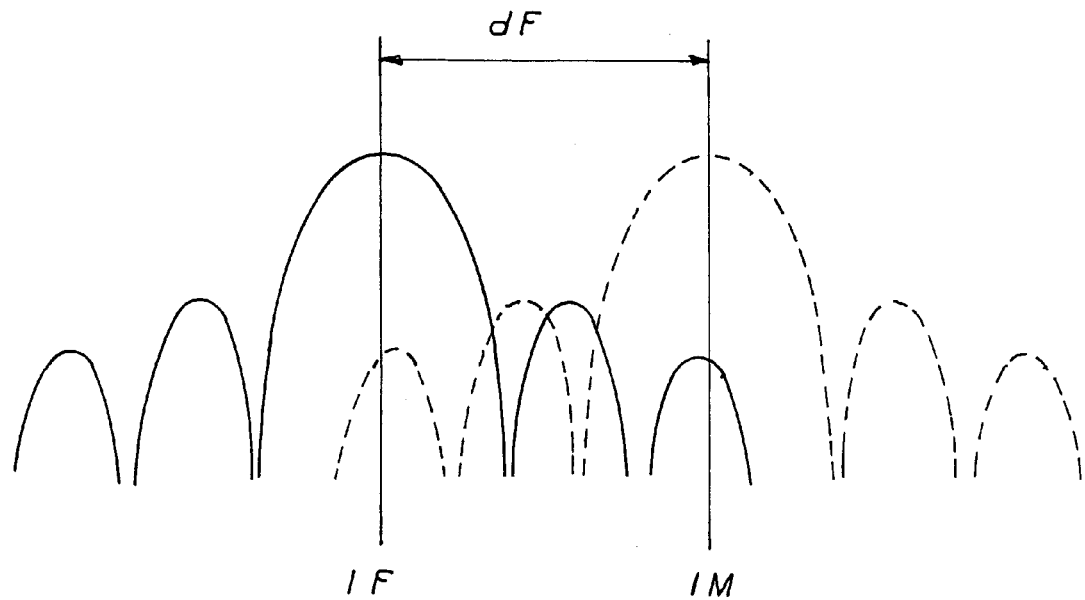
FIG. 4 is a pictorial representation of the resultant test spectrum consisting of the combination of both the intermediate frequency signal and the image frequency signal.
Figure 5:
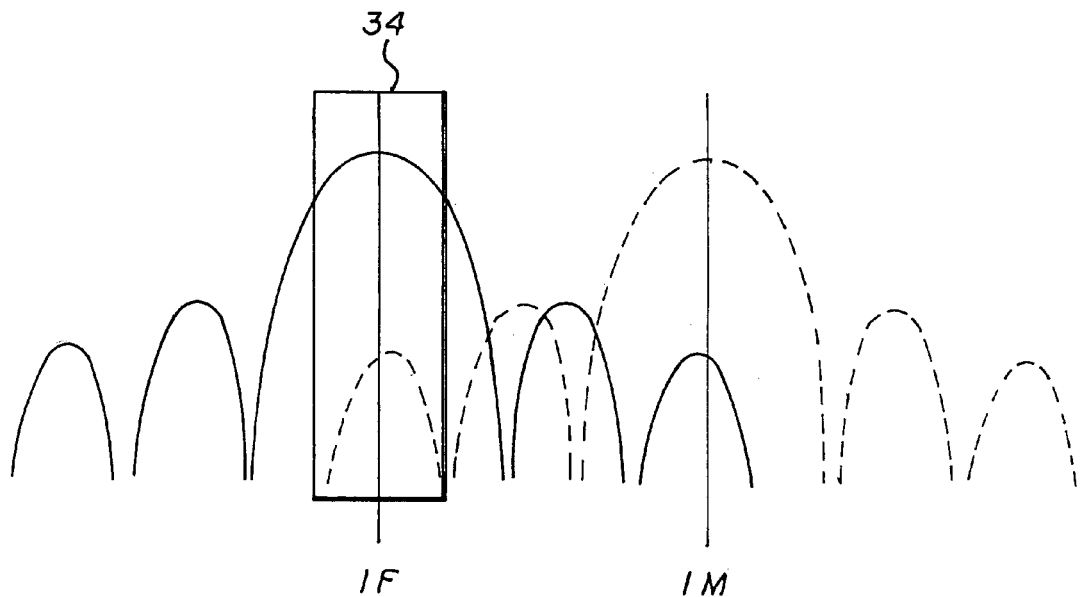
FIG. 5 is a pictorial representation of the resultant test spectrum consisting of the combination of both the intermediate frequency signal and the image frequency signal with the portion of the spectrum that will pass through the intermediate frequency filter to the receiver highlighted.

The subject circuit shown in FIG. 3, generally indicated by numeral 20, provides the necessary control to provide a SNR that is independent of both RF signal amplitude and temperature. The circuit includes a mixer 22 that receives the RF signal from a RF source 23 and from a local oscillator 24. A filter 26 receives the output from the mixer 22 and provides an output signal to a second mixer 28 coupled to a second local oscillator 30. A second filter 32, representing the IF filter of the receiver, receives the output from the second mixer 28. The output of the second filter 32 provides the signal-to-noise ratio that is insensitive to both signal amplitude and temperature as illustrated in FIGS. 4 and 5, to be subsequently discussed. Note that:

LO1 is the output signal from local oscillator 24
LO2 is the output signal from the local oscillator 30.

Therefore, the output signal-to-noise ratio signal 32 consists of two signals ((RF−LO1)−LO2) and ((RF−LO1)+LO2)

By definition:

$$IF=((RF-LO1)-LO2)$$

$$IM=((RF-LO1)+LO2)$$

$$IM=((RF-LO1)-LO2)$$

Comparing FIG. 2 and FIG. 3 it is obvious that by adding a second conversion stage to an existing single conversion receiver with two independently tunable local oscillators 24 and 30, not only can the desired IF signal frequency be controlled, but also the frequency of the desired IM signal. Because the IF and IM signals are created from the same signal and because the frequencies of the IF and IM signals are close (such that the mixer conversion loss is equal for both), the ratio of the two signals is independent of both the input signal's amplitude and system temperature.

Because certain receivers sometimes have more than one conversion stage, such as dual or triple conversion receivers, it may be possible to achieve the functionality of the circuit in FIG. 3 by simply repurposing existing circuitry. Additionally it may be possible to achieve the functionality of the circuit in FIG. 3 using only the second filter representing the IF filter of the receiver.

FIG. 4 is a pictorial representation of the combined spectrum of the IF and IM signals in which the two signals are separated in frequency by a frequency difference dF. FIG. 5 represents the same combined spectrum with the portion of the spectrum that will pass through the intermediate frequency filter passband of the receiver filter highlighted and indicated by numeral 34 Note that within the IF passband of the receiver, the IF signal represents the desired signal and the IM signal represents the noise. The IF filter of the receiver removes the out-of-band carrier portion of the IM signal.

The significance of this circuit is its ability to provide a controlled signal-to-noise ratio that is independent of input signal amplitude and operating temperature. By deriving both the signal (IF) and noise (IM) components from the input signal the ratio of the two can be made independent of the input signal amplitude. By keeping the frequencies of the IF and IM signals close, such that the mixer conversion loss is equal for both, the ratio of the two signals is independent of system temperature.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the electronics industry.
The invention claimed is:
1. An electronic circuit for testing a receiver comprising:
a RF signal generator providing an RF signal;
a first oscillator providing a first signal;
a first mixer coupled to said RF signal generator and said first oscillator for receiving the RF signal and said first signal and providing a first output signal comprising the RF signal plus the first signal and the RF signal minus the first signal;
a filter coupled to said first mixer for receiving the first output signal and providing a second output signal wherein the RF signal plus the first output signal is removed;
a second oscillator providing a third output signal; and
a second mixer coupled to said filter adapted to receive the second output signal; and to said second oscillator for receiving said third output signal and providing a fourth output; and
a second filter coupled to said second mixer for receiving said fourth output signal and providing an fifth output signal for testing the receiver that is amplitude and temperature insensitive.

* * * * *